US006684257B1

(12) United States Patent
Camut et al.

(10) Patent No.: US 6,684,257 B1
(45) Date of Patent: Jan. 27, 2004

(54) SYSTEMS, METHODS AND COMPUTER PROGRAM PRODUCTS FOR VALIDATING WEB CONTENT TAILORED FOR DISPLAY WITHIN PERVASIVE COMPUTING DEVICES

(75) Inventors: Samuel A. Camut, Apex, NC (US); Ivan M. Heninger, Selma, NC (US); Eric M. Vought, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/419,841

(22) Filed: Oct. 15, 1999

(51) Int. Cl.$^7$ ................................................ G06F 15/16
(52) U.S. Cl. ........................ 709/246; 709/231; 709/217
(58) Field of Search ................................ 709/246, 224, 709/219; 714/741, 736; 700/231, 203, 236, 217, 223

(56) References Cited

U.S. PATENT DOCUMENTS

| | | | | |
|---|---|---|---|---|
| 6,138,157 A | * | 10/2000 | Welter et al. ................. | 709/224 |
| 6,167,441 A | * | 12/2000 | Himmel ........................ | 709/217 |
| 6,247,048 B1 | * | 6/2001 | Greer et al. .................. | 709/219 |
| 6,247,050 B1 | * | 6/2001 | Tso et al. ..................... | 709/224 |
| 6,272,542 B1 | * | 8/2001 | Barnes et al. ................ | 709/224 |
| 6,311,058 B1 | * | 10/2001 | Wecker et al. ............... | 455/418 |
| 6,311,215 B1 | * | 10/2001 | Bakshi et al. ................ | 709/221 |
| 6,345,303 B1 | * | 2/2002 | Knauerhase et al. ......... | 709/238 |
| 6,401,132 B1 | * | 6/2002 | Bellwood et al. ............ | 709/246 |
| 6,421,733 B1 | * | 7/2002 | Tso et al. ..................... | 709/246 |

FOREIGN PATENT DOCUMENTS

| | | |
|---|---|---|
| WO | WO 98/36344 | 8/1998 |

OTHER PUBLICATIONS

Web page, "Cocoon", Java Apache Project, http://java.apache.org/cocoon/index.html (1999).

Web page, "HTTP Request," World Wide Web Consortium, http://www.w3.org/Protocols/HTTP/Request.html (1999).

Web Page, "HTTP Repsonse," World Wide Web Consortium, http://www.w3.org/Protocols/HTTP/Response.html (1999).

Web Page, "Hypertext Transfer Protocol—HTTP/1.1 Network Working Group Request for Comments 2068," http://info.internet.isi.edu:80/n–notes/rfc/files/rfc2068.txt (1999).

Driscoll, Steve; *Systematic Testing of WWW Applications*, Online Computer Library Center, Inc.; (OCLC); Version 1.01, Mar. 13, 1997, pp. 1–10; *http://www.oclc.org/wehart/paper2/*.

Lockhart, Thomas; PostgreSQL Administrator's Guide, V.6.5; pp. 5, 48–53; *http://www.us.postgresql.org/users–lounge/docs/6.5/amin.ps.gz*.

* cited by examiner

*Primary Examiner*—Saleh Najjar
*Assistant Examiner*—Abdullahi E. Salad
(74) *Attorney, Agent, or Firm*—Myers Bigel Sibley & Sajovec; Jeanine S. Ray-Yarletts

(57) ABSTRACT

Systems, methods and computer program products are provided for testing whether Web content has been properly tailored by a transcoding proxy for display within various requesting pervasive computing devices. Simulated Hyper-Text Transfer Protocol (HTTP) requests are built using information from one or more data files. Each simulated request includes a Uniform Resource Locator (URL) that identifies a location of Web content. Each simulated request also includes an HTTP header containing information about a respective pervasive computing device. Simulated HTTP requests are asynchronously issued to respective Web servers identified in the respective HTTP requests. An HTTP response to each respective simulated HTTP request is received and includes Web content tailored for display within a respective pervasive computing device associated with the respective simulated HTTP request. Each HTTP response is then compared with an expected HTTP response. An HTTP response that does not compare favorably with an expected HTTP response can be saved for later analysis.

39 Claims, 5 Drawing Sheets

SYSTEMS, METHODS AND COMPUTER PROGRAM PRODUCTS FOR VALIDATING WEB CONTENT TAILORED FOR DISPLAY WITHIN PERVASIVE COMPUTING DEVICES

FIELD OF THE INVENTION

The present invention relates generally to the display of Web page content and, more particularly, to tailoring Web content for display in client devices.

BACKGROUND OF THE INVENTION

The Internet is a worldwide decentralized network of computers having the ability to communicate with each other. The Internet has gained broad recognition as a viable medium for communicating and interacting across multiple networks. The World-Wide Web (Web) was created in the early 1990's, and is comprised of server-hosting computers (Web servers) connected to the Internet that have hypertext documents (referred to as Web pages) stored therewithin. Web pages are accessible by client programs (e.g., Web browsers) utilizing the Hypertext Transfer Protocol (HTTP) via a Transmission Control Protocol/Internet Protocol (TCP/IP) connection between a client-hosting device and a server-hosting device. While HTTP and Web pages are the prevalent forms for the Web, the Web itself refers to a wide range of protocols including Secure Hypertext Transfer Protocol (HTTPS), File Transfer Protocol (FTP), and Gopher, and Web content formats including plain text, HyperText Markup Language (HTML), Extensible Markup Language (XML), as well as image formats such as Graphics Interchange Format (GIF) and Joint Photographic Experts Group (JPEG).

A Web site is conventionally a collection of Web pages and other files related to a particular subject that includes a beginning file called a "home" page. A large Web site may reside on a number of geographically-dispersed Web servers. The Web site of the International Business Machines Corporation (www.ibm.com), for example, consists of thousands of Web pages and files spread out over various Web servers in locations world-wide.

An intranet is a private computer network conventionally contained within an enterprise and that conventionally includes one or more servers in communication with multiple user computers. An intranet may be comprised of interlinked local area networks and may also use leased-lines in a wide-area network. An intranet may or may not include connections to the outside Internet. Intranets conventionally utilize various Internet protocols and, in general, often look like private versions of the Internet. An intranet user conventionally accesses an intranet server via a browser running locally on his/her computer.

A Web (or intranet) server is a computer program (typically running on a computer) that serves requested Web pages and files. A Web client is a requesting program associated with a user. A browser is an exemplary Web client for use in requesting Web pages and files from Web servers. A Web server waits for a Web client, such as a browser, to open a connection and request a specific web page (or file). The Web server then sends a copy of the requested item, closes the connection, and waits for the next connection.

When a browser interacts with a Web server, the two programs typically utilize HTTP. HTTP allows a browser to request a specific item, which the Web server then returns and the browser renders. To ensure that browsers and Web servers can interoperate unambiguously, HTTP defines the exact format of requests (HTTP requests) sent from a browser to a Web server as well as the format of responses (HTTP responses) that the Web server returns to the browser.

Exemplary browsers for both Internet and intranet use include Netscape Navigator® (America Online, Inc., 22000 AOL Way, Dulles, Va.) and Internet Explorer® (Microsoft Corporation, Redmond, Wash.). Browsers typically provide a graphical user interface for retrieving and viewing Web pages, applications, and other resources hosted by Internet/intranet servers (hereinafter collectively referred to as "Web servers").

As is known to those skilled in this art, a Web page is conventionally formatted via a standard page description language such as HTML, which typically contains text and can reference graphics, sound, animation, and video data. HTML provides for basic document formatting and allows a Web content provider to specify anchors or hypertext links (typically manifested as highlighted text) to other Web servers and files. When a user selects a particular hypertext link, a browser reads and interprets an address, called a Uniform Resource Locator (URL) associated with the link, connects the browser with a Web server at that address, and makes a request (e.g., an HTTP request) for the file identified in the link. The Web server then sends the requested file to the Web client which the browser interprets and displays to the user.

Many new electronic devices, such as personal digital assistants (PDAs), hand-held computers, Internet-ready phones, and WebTVs, are gaining access to the Internet and/or to intranets as client devices. Electronic devices including, but not limited to, PDAs, cellular telephones, and computing devices utilized within appliances and automobiles, are often collectively referred to as "pervasive" computing devices. Many such pervasive computing devices utilize the Microsoft® Windows CE and 3Com Palm Computing® platforms.

Unfortunately, the capabilities of pervasive computing devices to receive, process, store and display Internet content may vary. For example, pervasive computing devices typically have displays that are small in size compared with desktop computer displays. As a result, content portions of a Web page, such as images and rendered HTML that may be otherwise displayable on a desktop computer display, may not be displayable on a pervasive computing device display unless some modifications to the images and/or text (i.e., the content) are made. For example, a desktop computer display having an array of 1024 pixels by 768 pixels may be able to display a large (e.g., 2 megabyte), 24 bit per pixel color image. A pervasive computing device with a display having an array of 120 pixels by 120 pixels, and with the ability to display only about 3 bits per pixel, may ignore much of the image data. As a result the image may not be displayed properly, if at all, via the pervasive computing device display unless the size of the image is transformed to the pervasive computing device's capabilities. Furthermore, some pervasive computing devices may not be capable of displaying certain image file types such as JPEG or GIF.

Text fonts and sizes within Web content may also need to be changed to permit the display thereof within a pervasive computing device display. Furthermore, common HTML features such as frames and tables may not be displayable by pervasive computing devices. Data within frames and tables may need to be removed and/or reformatted into other configurations for proper display. In addition, performance limitations of pervasive computing devices, such as memory size and connection bandwidth, may also require changes to Web page content for proper display thereof via a pervasive computing device.

It is known to take Web content that may not be properly displayable via a pervasive computing device and "tailor" the Web content into a format that is displayable. For example, large, high resolution, color images can be transformed into small, black and white images that can be displayed within small, low resolution displays. The tailoring of video, images, audio and text for display within a client device typically is referred to as "transcoding." Web content transcoding is described in detail in pending U.S. patent application Ser. No. 09/239,935 now U.S. Pat. No. 6,535,896 and Ser. No. 09/240,137 now U.S. Pat. No. 6,457,030 which are assigned to International Business Machines Corporation and which are incorporated herein by reference in their entirety. Web content transcoding is typically performed by a transcoding proxy associated with a Web server. Products for transcoding Web content for display by a requesting client device are known. An exemplary transcoding product is "Cocoon" available from the Apache Server Foundation at http://java.apache.org. Cocoon is described at http://java.apache.org/cocoon/index.html which is incorporated herein by reference.

To perform Web content transcoding, a Web server and/or transcoding proxy typically needs to know something about a client device making an HTTP request. As is known to those of skill in the art, an HTTP header accompanies HTTP requests to a Web server. An HTTP header typically provides information about a requesting client device and browser. Exemplary information provided within an HTTP header may include the size of a client device display, whether a client device display is a color display or a monochromatic display, an identification of the client device browser, and an identification of the client device operating system.

Pervasive computing devices with various browsers and configurations are being developed and introduced to market at a rapid pace. Given the variety of new pervasive computing devices, it may be difficult for Web content publishers to tailor content so as to be adequately displayable within many different devices. As a result, a need exists for quickly and easily verifying that Web content tailoring is being performed correctly for each type of client device making an HTTP request. Currently, testing whether or not Web content tailoring is being performed properly is done by making HTTP requests with each actual client device. Unfortunately, the ability to test Web content tailoring with many different client devices may be expensive and time consuming, and may be technically infeasible to analytically validate responses.

SUMMARY OF THE INVENTION

In view of the above discussion, it is an object of the present invention to provide systems, methods and computer program products for simulating different client devices running on various software platforms to ensure that Web page content tailoring is performed correctly.

It is another object of the present invention to facilitate the display of Web pages via pervasive computing devices that may have smaller displays and various performance limitations as compared with desktop computing devices.

These and other objects of the present invention are provided by systems, methods and computer program products for testing (i.e., validating) whether Web content has been properly tailored by a transcoding proxy for display within various requesting pervasive computing devices. Simulated HyperText Transfer Protocol (HTTP) requests are built using information from one or more data files. Each simulated request preferably includes a Uniform Resource Locator (URL) that identifies a location of Web content. Each simulated request also preferably includes an HTTP is header containing information about a respective pervasive computing device. Exemplary pervasive computing device information included within an HTTP header may include, but is not limited to, an identification of a device's browser, an identification of a device's operating system, characteristics of a device's display, and information about Web content a device is configured to display.

Simulated HTTP requests are issued to respective Web servers identified in the respective HTTP requests. An HTTP response to each respective simulated HTTP request is received and includes Web content tailored for display within a respective pervasive computing device associated with the respective simulated HTTP request. Each HTTP response is then compared with an expected HTTP response. An HTTP response that does not compare favorably with an expected HTTP response can be saved for later analysis.

The present invention may facilitate determining whether Web content is properly tailored for display within virtually any type of client device having virtually any type of configuration without requiring that the actual device be used in the test. As a result, use of the present invention by Web content providers may result in considerable time savings, cost savings, and higher quality program products.

DETAILED DESCRIPTION OF THE INVENTION

Figure 1:
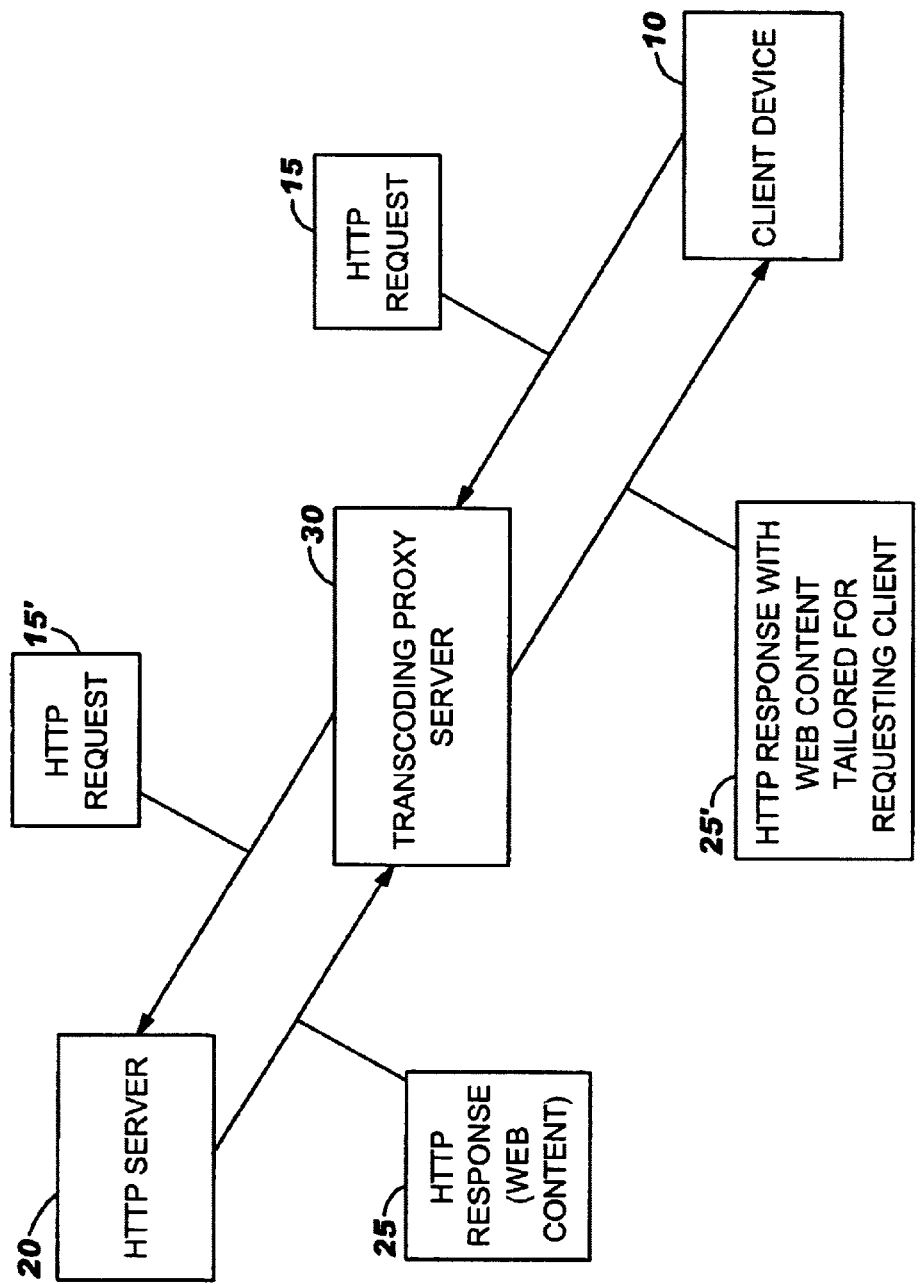
FIG. 1 schematically illustrates the paths of an HTTP request and corresponding HTTP response in a client-server environment including a transcoding proxy that tailors Web content for display within requesting client devices.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention is preferably written in an object oriented programming language such as JAVA®, Smalltalk or C++. However, the computer program code for carrying out operations of the present invention may also be written in conventional procedural programming languages, such as the "C" programming language, or in a functional (or fourth generation) programming language such as Lisp, SML, or Forth.

The present invention is described below with reference to block diagrams and/or flowchart illustrations of methods, apparatus (systems) and computer program products according to an embodiment of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block diagram and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block diagram and/or flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

Referring now to FIG. 1, the paths of an HTTP request and corresponding HTTP response in a client-server relationship, including a transcoding proxy that tailors Web content, are schematically illustrated. A client device 10 makes an HTTP request 15 for Web content from an HTTP (i.e., Web) server 20. The protocol for HTTP requests and responses are described in detail in "Hypertext Transfer Protocol—HTTP/1.1", Network Working Group Request for Comments 2068, January 1997, which is incorporated herein by reference in its entirety.

In the illustrated client-server relationship, the HTTP request 15 passes through a transcoding proxy 30 and is modified by the transcoding proxy 30, as would be understood by one of skill in the art. The modified HTTP request 15' is processed by the HTTP server 20 and an HTTP response 25 containing the requested Web content is sent to the client device 10 via the transcoding proxy 30. The transcoding proxy 30 tailors the Web content within the HTTP response 25 producing a "modified" HTTP response 25'. The tailored Web content in the modified HTTP response 25' is renderable within the client device 10. It is understood that a transcoding proxy 30 may be implemented as software code residing within the HTTP server 20, as software code external to the HTTP server 20, such as within a firewall, or some combination thereof.

The present invention provides methods, systems and computer program products for validating transcoded Web content provided in response to HTTP requests without requiring the actual client devices to make the HTTP requests. According to the present invention, multiple client requests can be simulated by a single computer in communication with one or more Web servers, such as via the Internet, an intranet, or other communications network.

Figure 2:
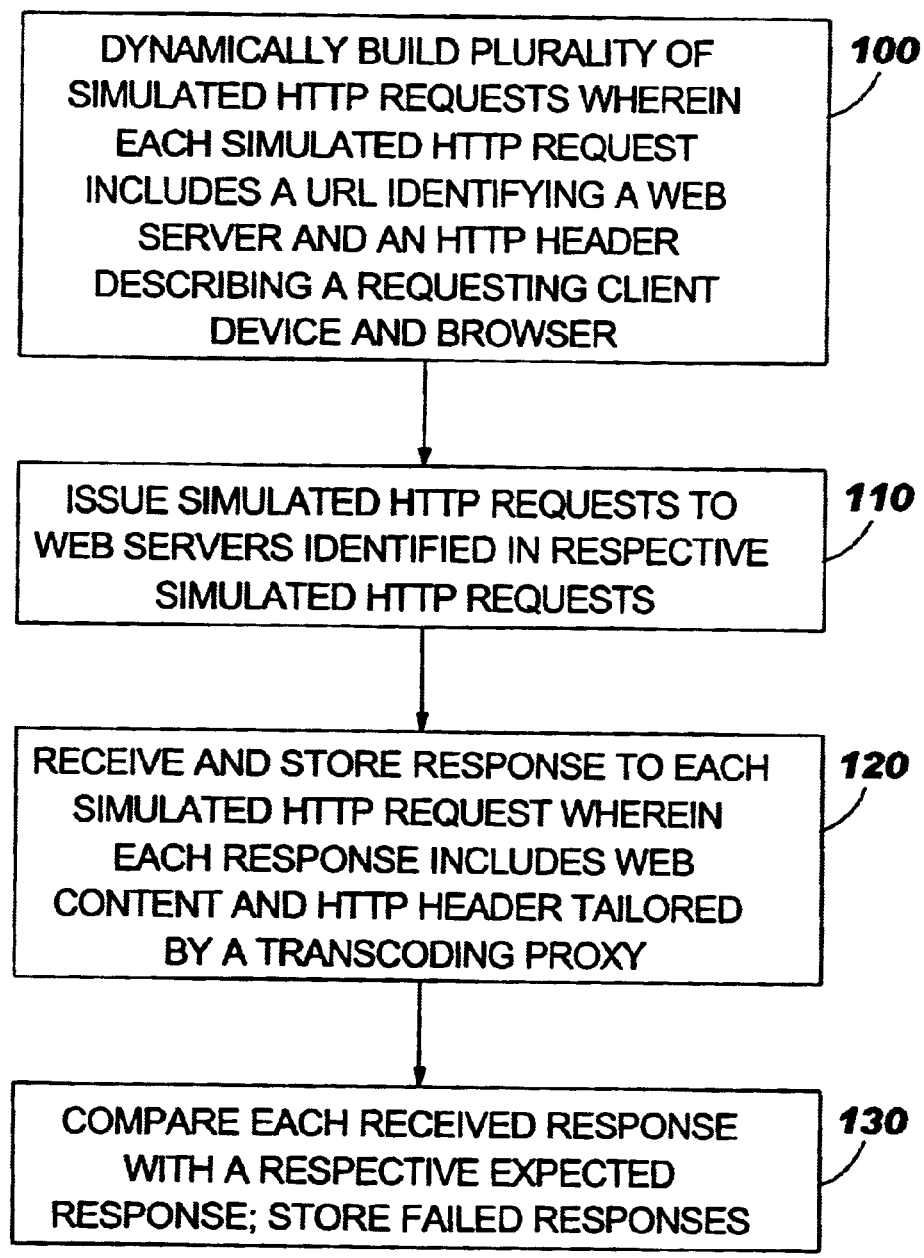
FIG. 2 is a flow chart illustrating operations for validating transcoded Web content provided in response to a client request according to the present invention.

Referring now to FIG. 2, operations for validating transcoded Web content according to the present invention are illustrated. A plurality of simulated HTTP requests are built (Block 100) by a computing device using various data files. Each simulated HTTP request includes a Uniform Resource Locator (URL) that identifies the location of specific Web content to be displayed within a requesting client device. Each HTTP request also includes an HTTP header that contains information about a requesting client device and that specifies what types of Web content the client device is prepared to handle. As is known to those of skill in the art, HTTP headers communicate information that Web servers and browsers use to define the type of data that is being exchanged therebetween.

Simultaneous HTTP requests are preferably issued asynchronously to Web servers identified in the respective HTTP requests (Block 110, FIG. 2). Preferably, a computing device for implementing the present invention implements the HTTP "GET" method for each of the respective HTTP requests. The HTTP "GET" method, which is well understood by those skilled in the art, is described in detail in "Hypertext Transfer Protocol—HTTP/1.1", Network Working Group Request for Comments 2068, January 1997.

An HTTP response to each HTTP request is preferably stored (Block 120, FIG. 2). Each HTTP response includes an HTTP header and Web content that has been tailored for display within a client device identified as making the corresponding HTTP request. Each received HTTP response is compared with an expected HTTP response (Block 130, FIG. 2). HTTP responses not matching their respective expected responses are preferably saved for later analysis.

Figure 3:
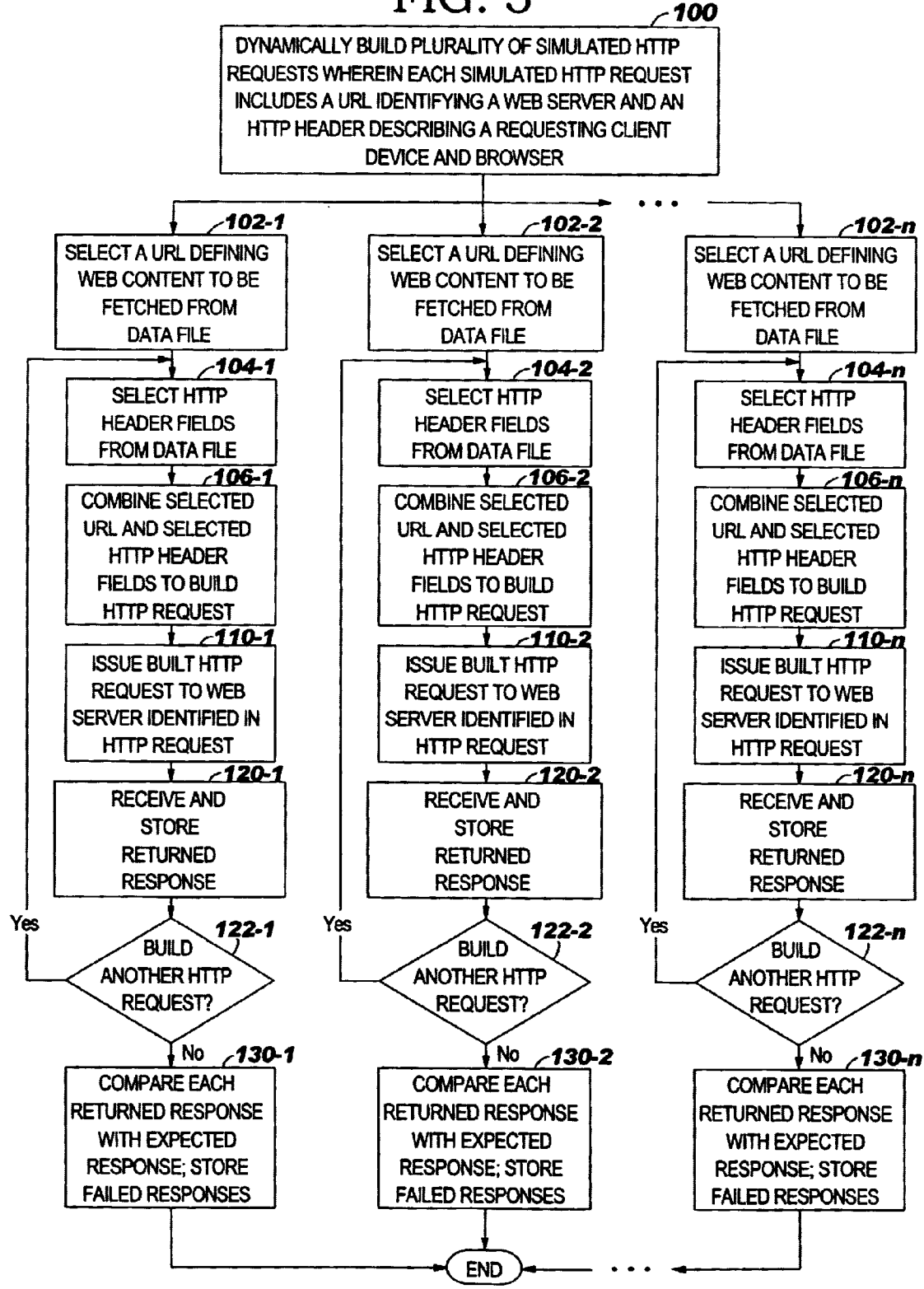
FIG. 3 is a detailed flow chart illustrating operations for building and issuing a plurality of HTTP requests and validating transcoded Web content provided in response to the HTTP requests according to the present invention.

As illustrated in FIG. 3, multiple simulated HTTP requests can be built and issued simultaneously and asynchronously up to "n" iterations, where n can be virtually any value. Simultaneous building and issuance of multiple, simulated HTTP requests are schematically represented by operations 102-1 through 130-1, operations 102-2 through 130-2, and operations 102-n through 130-n. A detailed description of operations 102-1 through 130-1 is provided below and it is understood that these operations are the same for any of the n iterations.

For each HTTP request, a computing device implementing the present invention preferably selects a URL defining Web content to be fetched from a data file (Block 102-1). Similarly, HTTP header fields are preferably selected from a data file (Block 104-1). A selected URL and selected HTTP header fields are then combined to build each respective HTTP request (Block 106-1). Each built HTTP request is then issued to the Web server identified in the built HTTP request (Block 110-1).

After a response to an HTTP request is received and stored (Block 120-1), a decision is made whether to build another HTTP request (Block 122-1). Once a decision is made not to build another HTTP request, each returned HTTP response is compared with an expected response (Block 130-1). Preferably, each failed response is stored for later analysis to determine why the Web content was not properly transcoded.

The decision to build another HTTP request may depend on the Web content returned in an HTTP request. For example, if Web content within an HTTP response contains images, the present invention may build respective HTTP requests for each image. Accordingly, the methods of the present invention may be recursive and the iterative steps of FIG. 3 may continue until all types of files within a Web page are requested. As a result, the tailoring of content of an entire Web site can be validated via a data processing system implementing the present invention.

Exemplary information about a requesting client device that is provided within HTTP header fields may include, but is not limited to, an identification of a browser running on the client device (e.g., user-agent), an identification of the client device operating system, an identification of characteristics of the client device display, and an identification of Web content the client device is configured to display. Exemplary client device display characteristics include, but are not limited to, display size and whether or not the display is a color display or a monochromatic display.

Figure 4:
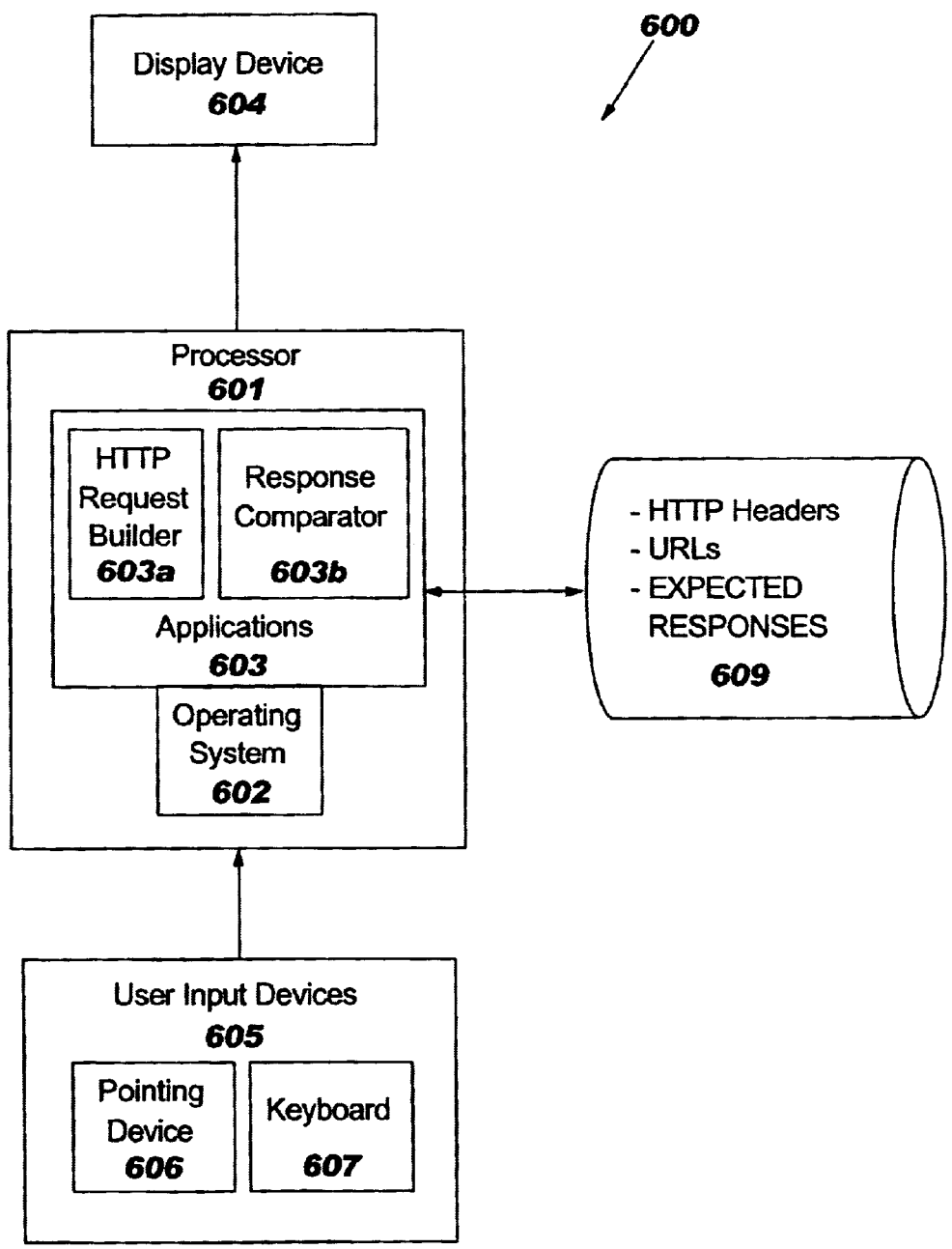
FIG. 4 is a schematic illustration of a data processing system for carrying out operations of the present invention.

Referring now to FIG. 4, a data processing system 600 for carrying out operations of the present invention are schematically illustrated. As seen in FIG. 4, a data processor 601 may have an operating system 602 resident therein with various application programs 603 for carrying out operations of the present invention and that run on the operating system 602. In particular, an HTTP Request Builder application 603*a* is provided to carry out the HTTP request building and issuing operations set forth in Blocks 100 and 110 of FIG. 2 and Blocks 100 through 122-1 of FIG. 3. A Response Comparator application 603*b* is provided to carry out operations for comparing received HTTP responses with expected responses set forth in Block 130 of FIG. 2 and Block 130-1 of FIG. 3.

Still referring to FIG. 4, the applications 603*a*, 603*b* are in communication with data storage 609, which may be either external or internal data storage, or a combination of external and internal data storage. The HTTP Request Builder application 603*a* is configured to read HTTP header elements and URLs from data storage 609, and build and issue HTTP requests as set forth in Blocks 100 and 110 of FIG. 2 and Blocks 100 through 122-1 of FIG. 3. The Response Comparator application 603*b* is configured to compare received HTTP responses with expected responses set forth in Block 130 of FIG. 2 and Block 130-1 of FIG. 3. In addition, data storage 609 may be utilized to store built HTTP requests and to store received HTTP responses and for implementing the various method steps of the present invention as one or more batch processes.

As would be understood by one of skill in the art, the processor 601 displays information on a display device 604. The display device 604 has a plurality of picture elements (collectively referred to as a screen) which may define the appearance of a graphical user interface (GUI) displayed on the display device 604. The contents of the screen and, therefore, the appearance of a GUI, may be controlled or altered by the one or more application programs 603*a*, 603*b* or the operating system 602, either individually or in combination. For obtaining input from a user, the operating system 602, the application programs 603*a*, 603*b*, or a combination thereof, may utilize user input devices 605. User input devices 605 may include a pointing device 606 and a keyboard 607 or other input devices known to those of skill in the art.

Figure 5:
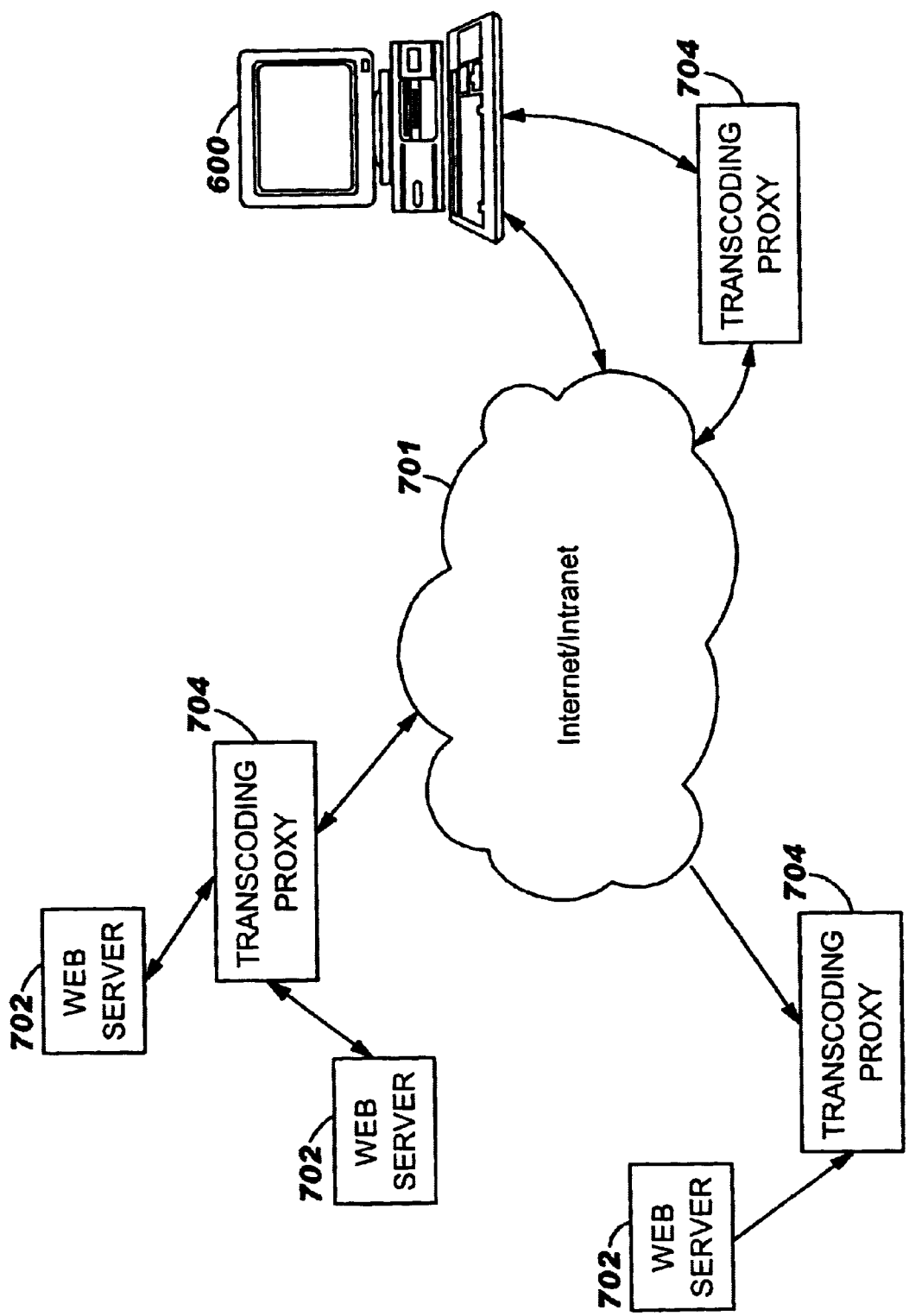
FIG. 5 is a schematic illustration of a data processing system in communication with a plurality of Web servers and transcoding proxies, wherein the data processing system is configured to build and send a plurality of HTTP requests and to receive a corresponding plurality of respective HTTP responses according to the present invention.

Referring now to FIG. 5, a data processing system 600 for carrying out operations of the present invention is illustrated in communication with a plurality of Web servers 702 and transcoding proxies 704 via a communications network, such as the Internet and/or an intranet 701. In the illustrated embodiment, one or more Web servers 702 may utilize a transcoding proxy 704 that is configured to tailor Web content as described above. The data processing system 600 is configured as described above to simulate HTTP requests from multiple pervasive computing devices without requiring actual pervasive computing devices to make the HTTP requests. The data processing system 600 builds and issues multiple HTTP requests, wherein each HTTP request includes an HTTP header that contains information about a respective pervasive client device/browser configuration. These HTTP requests can then be sent to designated Web servers as asynchronous, parallel requests.

The data processing system 600 is configured as described above to receive, via the Internet and/or intranet 701, HTTP responses to the HTTP requests and to compare the HTTP responses with expected HTTP responses. Preferably, the data processing system 600 is configured to store HTTP responses and then perform HTTP response comparison operations as a batch process. Accordingly, the present invention provides an efficient, cost effective way of more thoroughly testing Web content tailoring for multiple pervasive computing devices without requiring the actual pervasive computing devices.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of validating Web content tailored for display within a pervasive computing device in response to a simulated request from the pervasive computing device generated by a data processing system that is not the pervasive computing device, the method comprising the following steps:

building a simulated HyperText Transfer Protocol (HTTP) request of a pervasive computing device via a separate data processing system that is not the pervasive computing device, wherein the simulated HTTP request includes a Uniform Resource Locator (URL) that identifies a location of Web content, and wherein the simulated HTTP request includes an HTTP header that contains information about the pervasive computing device;

issuing the simulated HTTP request from the data processing system independently of the pervasive computing device to a Web server identified in the simulated HTTP request;

receiving at the data processing system independently of the pervasive computing device an HTTP response from the Web server, wherein the HTTP response includes Web content tailored for display within the pervasive computing device by a transcoding proxy adapted to tailor Web content for display within pervasive computing devices; and comparing the received HTTP response with an expected response.

2. The method according to claim 1 wherein the pervasive computing device information includes at least one of an identification of a browser running on the pervasive computing device, an identification of an operating system running on the pervasive computing device, an identification of characteristics of a display for the pervasive computing device, and an identification of Web content the pervasive computing device is configured to display.

3. The method according to claim 1 further comprising the step of storing the HTTP response received in response to the simulated HTTP request.

4. The method according to claim 1 further wherein the step of comparing the received HTTP response with an expected HTTP response comprises the step of storing the received HTTP response if the received HTTP response does not match the expected HTTP response.

5. The method according to claim 1 wherein the step of building a simulated HTTP request via the data processing system comprises:

building a plurality of simulated HTTP requests from a respective plurality of pervasive computing devices via the data processing system, wherein each simulated HTTP request includes a Uniform Resource Locator (URL) that identifies a location of Web content, and wherein each simulated HTTP request includes an HTTP header that contains information about a respective pervasive computing device; and storing the plurality of simulated HTTP requests.

6. The method according to claim 5 wherein the step of issuing the simulated HTTP request via the data processing system to a Web server identified in the simulated HTTP request comprises asynchronously issuing the plurality of simulated HTTP requests via the data processing system to Web servers identified in each respective simulated HTTP request.

7. The method according to claim 5 wherein the step of building a plurality of simulated HTTP requests via the data processing system comprises retrieving HTTP header fields and URLs from respective data files.

8. The method according to claim 5 wherein the step of comparing the received HTTP response with an expected HTTP response comprises comparing each received HTTP response with an expected HTTP response for a pervasive computing device associated with each respective simulated HTTP request.

9. A method of validating Web content tailored for display within a plurality of pervasive computing devices in response to simulated requests from the pervasive computing devices generated by a data processing system that is not one of the pervasive computing devices, the method comprising the following steps:

building a plurality of simulated HyperText Transfer Protocol (HTTP) requests for one or more pervasive computing devices via a separate data processing system that is not the one or more pervasive computing devices, wherein each simulated HTTP request includes a Uniform Resource Locator (URL) that identifies a location of Web content, and wherein each simulated HTTP request includes an HTTP header that contains information about a respective pervasive computing device;

asynchronously issuing each simulated HTTP request from the data processing system independently of the one or more pervasive computing devices to a Web server identified in each respective simulated HTTP request;

receiving at the data processing system independently of the one or more pervasive computing devices an HTTP response to each respective simulated HTTP request, wherein each HTTP response includes Web content tailored for display within a pervasive computing device identified within a respective simulated HTTP request; and comparing each received HTTP response with an expected HTTP response for a pervasive computing device specified in each respective simulated HTTP request.

10. The method according to claim 9 wherein pervasive computing device information within each simulated HTTP request includes at least one of an identification of a browser running on a pervasive computing device, an identification of an operating system running on a pervasive computing device, an identification of characteristics of a pervasive computing device display, and an identification of Web content a pervasive computing device is configured to display.

11. The method according to claim 9 further comprising the step of storing the HTTP responses received in response to the simulated HTTP requests.

12. The method according to claim 9 wherein the step of comparing each received HTTP response with a respective expected HTTP response comprises storing the received HTTP response if the received HTTP response does not match the expected HTTP response.

13. The method according to claim 9 wherein the step of building a plurality of simulated HTTP requests comprises retrieving HTTP header fields and URLs from respective data files.

14. A system that validates Web content tailored for display within a pervasive computing device in response to a simulated request from the pervasive computing device generated by a data processing system that is not the pervasive computing device, comprising:

means for building a simulated HyperText Transfer Protocol (HTTP) request of a pervasive computing device independently of the pervasive computing device, wherein the simulated HTTP request includes a Uniform Resource Locator (URL) that identifies a location of Web content, and wherein the simulated HTTP request includes an HTTP header that contains information about the pervasive computing device;

means for issuing the simulated HTTP request from the data processing system independently of the pervasive computing device to a Web server identified in the simulated HTTP request;

means for receiving at the data processing system independently of the pervasive computing device an HTTP response from the Web server, wherein the HTTP response includes Web content tailored for display within the pervasive computing device by a transcoding proxy adapted to tailor Web content for display within pervasive computing devices; and means for comparing the received HTTP response with an expected HTTP response.

15. The system according to claim 14 wherein the pervasive computing device information includes at least one of an identification of a browser running on the pervasive computing device, an identification of an operating system running on the pervasive computing device, an identification of characteristics of a display for the pervasive computing device, and an identification of Web content the pervasive computing device is configured to display.

16. The system according to claim 14 wherein the means for receiving an HTTP response from the Web server comprises means for storing the HTTP response.

17. The system according to claim 14 wherein the means for comparing the received HTTP response with an expected HTTP response comprises means for storing the received HTTP response if the received HTTP response does not match the expected HTTP response.

18. The system according to claim 14 wherein the means for building a simulated HTTP request comprises:

means for building a plurality of simulated HTTP requests from a respective plurality of pervasive computing devices, wherein each simulated HTTP request includes a Uniform Resource Locator (URL) that identifies a location of Web content, and wherein each simulated HTTP request includes an HTTP header that contains information about a respective pervasive computing device; and means for storing the plurality of simulated HTTP requests.

19. The system according to claim 18 wherein the means for issuing the simulated HTTP request via the data processing system to a Web server identified in the simulated HTTP request comprises means for asynchronously issuing the plurality of simulated HTTP requests to Web servers identified in each respective simulated HTTP request.

20. The system according to claim 18 wherein the means for building a plurality of simulated HTTP requests via the data processing system comprises means for retrieving HTTP header fields and URLs from respective data files.

21. The system according to claim 18 wherein the means for comparing the received HTTP response with an expected HTTP response comprises means for comparing each received HTTP response with an expected HTTP response for a pervasive computing device associated with each respective simulated HTTP request.

22. A system that validates Web content tailored for display within a plurality of pervasive computing devices in response to simulated requests from the pervasive computing devices generated by a data processing system that is not one of the pervasive computing devices, comprising:

means for building a plurality of simulated HyperText Transfer Protocol (HTTP) requests of one or more pervasive computing devices independently of the one or more pervasive computing devices, wherein each simulated HTTP request includes a Uniform Resource Locator (URL) that identifies a location of Web content, and wherein each simulated HTTP request includes an HTTP header that contains information about a respective pervasive computing device;

means for asynchronously issuing independently of the one or more pervasive computing devices each simulated HTTP request from the data processing system to a Web server identified in each respective simulated HTTP request;

means for receiving independently of the one or more pervasive computing devices an HTTP response to each respective simulated HTTP request, wherein each HTTP response includes Web content tailored for display within a pervasive computing device identified within a respective simulated HTTP request; and means for comparing each received HTTP response with an expected HTTP response for a pervasive computing device specified in each respective simulated HTTP request.

23. The system according to claim 22 wherein pervasive computing device information within each simulated HTTP request includes at least one of an identification of a browser running on a pervasive computing device, an identification of an operating system running on a pervasive computing device, an identification of characteristics of a pervasive computing device display, and an identification of Web content a pervasive computing device is configured to display.

24. The system according to claim 22 wherein the means for receiving an HTTP response to each respective simulated HTTP request comprises means for storing the HTTP responses.

25. The system according to claim 22 wherein the means for comparing each received HTTP response with a respective expected HTTP response comprises means for storing the received HTTP response if the received HTTP response does not match the expected HTTP response.

26. The system according to claim 22 wherein the means for building a plurality of simulated HTTP requests comprises means for retrieving HTTP header fields and URLs from respective data files.

27. A computer program product for validating Web content tailored for display within a pervasive computing device in response to a simulated request from the pervasive computing device generated by a data processing system that is not the pervasive computing device, the computer program product comprising a computer usable storage medium having computer readable program code means embodied in the medium, the computer readable program code means comprising:

computer readable program code means for building a simulated HyperText Transfer Protocol (HTTP) request of a pervasive computing device independently of the pervasive computing device, wherein the simulated HTTP request includes a Uniform Resource Locator (URL) that identifies a location of Web content, and wherein the simulated HTTP request includes an HTTP header that contains information about the pervasive computing device;

computer readable program code means for issuing independently of the pervasive computing device the simulated HTTP request from the data processing system to a Web server identified in the simulated HTTP request;

computer readable program code means for receiving independently of the pervasive computing device at the data processing system an HTTP response from the Web server, wherein the HTTP response includes Web content tailored for display within the pervasive computing device by a transcoding proxy adapted to tailor Web content for display within pervasive computing devices; and computer readable program code means for comparing the received HTTP response with an expected HTTP response.

28. The computer program product according to claim 27 wherein the pervasive computing device information includes at least one of an identification of a browser running on the pervasive computing device, an identification of an operating system running on the pervasive computing device, an identification of characteristics of a display for the pervasive computing device, and an identification of Web content the pervasive computing device is configured to display.

29. The computer program product according to claim 27 wherein the computer readable program code means for receiving an HTTP response from the Web server comprises computer readable program code means for storing the HTTP response.

30. The computer program product according to claim 27 wherein the computer readable program code means for comparing the received HTTP response with an expected HTTP response comprises computer readable program code means for storing the received HTTP response if the received HTTP response does not match the expected HTTP response.

31. The computer program product according to claim 27 wherein the computer readable program code means for building a simulated HTTP request comprises:

computer readable program code means for building a plurality of simulated HTTP requests from a respective plurality of pervasive computing devices, wherein each simulated HTTP request includes a Uniform Resource Locator (URL) that identifies a location of Web content, and wherein each simulated HTTP request includes an HTTP header that contains information about a respective pervasive computing device; and computer readable program code means for storing the plurality of simulated HTTP requests.

32. The computer program product according to claim 31 wherein the computer readable program code means for issuing the simulated HTTP request via the data processing system to a Web server identified in the simulated HTTP request comprises computer readable program code means for asynchronously issuing the plurality of simulated HTTP requests to Web servers identified in each respective simulated HTTP request.

33. The computer program product according to claim 31 wherein the computer readable program code means for building a plurality of simulated HTTP requests via the data processing system comprises computer readable program code means for retrieving HTTP header fields and URLs from respective data files.

34. The computer program product according to claim 31 wherein the computer readable program code means for comparing the received HTTP response with an expected HTTP response comprises computer readable program code means for comparing each received HTTP response with an expected HTTP response for a pervasive computing device associated with each respective simulated HTTP request.

35. A computer program product that validates Web content tailored for display within a plurality of pervasive computing devices in response to simulated requests from the pervasive computing devices generated by a data processing system that is not one of the pervasive computing devices, the computer program product comprising a computer usable storage medium having computer readable program code means embodied in the medium, the computer readable program code means comprising:

computer readable program code means for building a plurality of simulated HyperText Transfer Protocol (HTTP) requests of one or more pervasive computing devices independently of the one or more pervasive computing devices, wherein each simulated HTTP request includes a Uniform Resource Locator (URL) that identifies a location of Web content, and wherein each simulated HTTP request includes an HTTP header that contains information about a respective pervasive computing device;

computer readable program code means for asynchronously issuing independently of the one or more pervasive computing devices each simulated HTTP request from the data processing system to a Web server identified in each respective simulated HTTP request;

computer readable program code means for receiving independently of the one or more pervasive computing devices an HTTP response to each respective simulated HTTP request, wherein each HTTP response includes Web content tailored for display within a pervasive computing device identified within a respective simulated HTTP request; and computer readable program code means for comparing each received HTTP response with an expected HTTP response for a pervasive computing device specified in each respective simulated HTTP request.

36. The computer program product according to claim 35 wherein pervasive computing device information within each simulated HTTP request includes at least one of an identification of a browser running on a pervasive computing device, an identification of an operating system running on a pervasive computing device, an identification of characteristics of a pervasive computing device display, and an identification of Web content a pervasive computing device is configured to display.

37. The computer program product according to claim 35 wherein the computer readable program code means for receiving an HTTP response to each respective simulated HTTP request comprises computer readable program code means for storing the HTTP responses.

38. The computer program product according to claim 35 wherein the computer readable program code means for comparing each received HTTP response with a respective expected HTTP response comprises computer readable program code means for storing the received HTTP response if the received HTTP response does not match the expected HTTP response.

39. The computer program product according to claim 35 wherein the computer readable program code means for building a plurality of simulated HTTP requests comprises computer readable program code means for retrieving HTTP header fields and URLs from respective data files.

* * * * *